United States Patent
To et al.

(10) Patent No.: US 7,991,020 B2
(45) Date of Patent: Aug. 2, 2011

(54) QUAD RATE TRANSMITTER EQUALIZATION

(75) Inventors: Hing (Thomas) Yan To, Cupertino, CA (US); Jun Cai, Mather, CA (US); Matt Dayley, Placerville, CA (US)

(73) Assignee: Intel Corporation, Santa Clara, CA (US)

( * ) Notice: Subject to any disclaimer, the term of this patent is extended or adjusted under 35 U.S.C. 154(b) by 1521 days.

(21) Appl. No.: 11/396,334

(22) Filed: Mar. 31, 2006

(65) Prior Publication Data

US 2007/0230515 A1 Oct. 4, 2007

(51) Int. Cl.
*H04J 3/02* (2006.01)
*H04B 1/38* (2006.01)
*H03K 5/159* (2006.01)

(52) U.S. Cl. .................. 370/538; 375/219; 375/232
(58) Field of Classification Search .................. None
See application file for complete search history.

(56) References Cited

U.S. PATENT DOCUMENTS

| | | | |
|---|---|---|---|
| 6,392,443 B1* | 5/2002 | Gauthier | 326/86 |
| 2002/0154248 A1* | 10/2002 | Wittig et al. | 348/614 |
| 2002/0186056 A1* | 12/2002 | Jong et al. | 327/108 |
| 2004/0037373 A1* | 2/2004 | Ashley et al. | 375/341 |
| 2006/0010284 A1* | 1/2006 | Srinivasan et al. | 711/108 |
| 2006/0071687 A1* | 4/2006 | Kim | 326/82 |
| 2006/0179372 A1* | 8/2006 | Volk | 714/724 |
| 2009/0179682 A1* | 7/2009 | Khoury et al. | 327/306 |

* cited by examiner

*Primary Examiner* — Ricky Ngo
*Assistant Examiner* — Clemence Han
(74) *Attorney, Agent, or Firm* — Trop, Pruner & Hu, P.C.

(57) ABSTRACT

An integrated circuit includes current mode drivers that provide equalized outputs. A parallel-to-serial converter circuit receives data at less than one fourth the output data rate, and provides main data and equalization data at one fourth the output data rate to at least one four-to-one multiplexer. The main data and equalization data is multiplexed onto an output node at the output data rate.

16 Claims, 7 Drawing Sheets

US 7,991,020 B2

QUAD RATE TRANSMITTER EQUALIZATION

FIELD

The present invention relates generally to integrated circuits, and more specifically to transmitter equalization in integrated circuits.

BACKGROUND

Electrical signals may become attenuated as they travel through conductors. To counteract the effects of attenuation, the amplitude of a signal may be increased or decreased based on the contents of the signal prior to transmission. This process may be referred to as "equalization" or "pre-emphasis."

DESCRIPTION OF EMBODIMENTS

Figure 1:
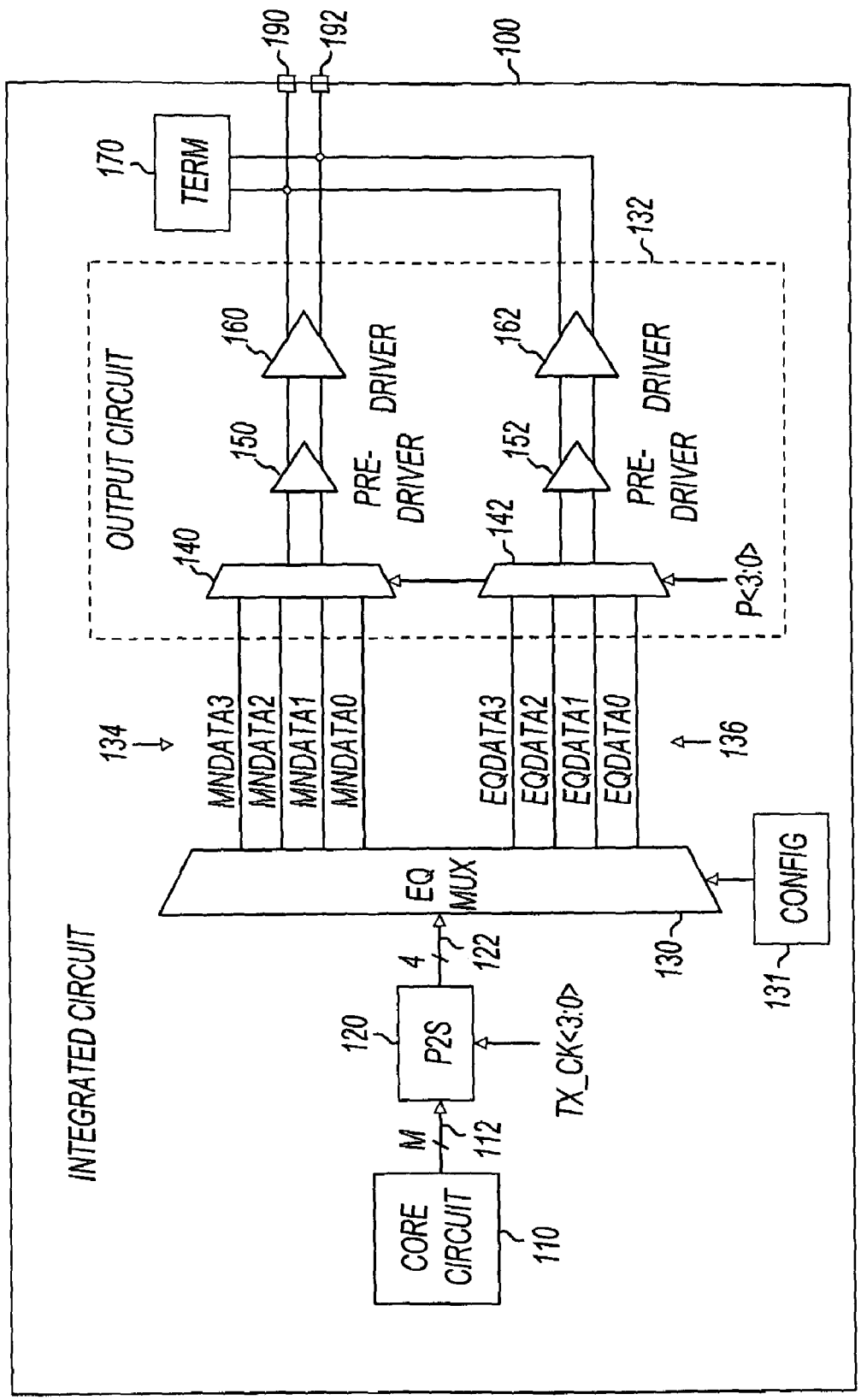
FIG. 1 shows an integrated circuit with quad rate transmitter equalization.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows an integrated circuit with quad rate transmitter equalization. Integrated circuit 100 shows core circuit 110, parallel to serial (P2S) converter 120, equalization multiplexer 130, configuration register 131, output circuit 132, on-die terminations 170, and output pads 190 and 192. Output circuit 132 includes output multiplexers 140 and 142, pre-drivers 150 and 152, and current mode output drivers 160 and 162.

In operation, output circuit 132 drives differential main data and equalization data on nodes 190 and 192 at an output data rate. Output circuit 132 receives the main data and equalization data from equalization multiplexer 130 at one-fourth of the output data rate. Output multiplexers 140 and 142 are four-to-one multiplexers that multiplex signals received from equalization multiplexer 130 under the control of multiplexer control signals P<3:0>, and produce differential signals to drive pre-drivers 150 and 152. Pre-drivers 150 and 152 drive current mode drivers 160 and 162, which in turn drive currents on output nodes 190 and 192. The currents output from current mode drivers 160 and 162 combine at output nodes 190 and 192 to form a final output signal.

Output multiplexer 140, pre-driver 150, and current mode driver 160 form a main driver chain. Further, output multiplexer 142, pre-driver 152, and current mode driver 162 form an equalization driver chain. In these embodiments, main data is driven through the main driver chain and equalization data is driven through the equalization driver chain, and the main data and the equalization data are combined into a differential output signal at the output data rate on output nodes 190 and 192.

In some embodiments, current mode drivers 160 and 162 have different drive strengths. For example, main data driver 160 may have a larger drive capacity than equalization data driver 162. In some embodiments, main data driver 160 may include multiple parallel drivers. Further, equalization data driver 162 may also include multiple parallel drivers.

Equalization data may provide additional drive strength when needed. For example, when the main data is changing from a "0" to a "1," or from a "1" to a "0," the equalization data may cause driver 162 to provide additional drive capability in order to effect the transition on output nodes 190 and 192. In contrast, when the main data is remaining at a "0" or a "1," the equalization data is chosen so as not to cause additional current drive.

Equalization multiplexer 130 receives "intermediate data" at 122 from parallel-to-serial converter 120, and steers the data based on configuration information in configuration register 131. In some embodiments, the intermediate data is the same as the main data sourced to output multiplexer 140. The intermediate data at 122 is sourced by parallel-to-serial circuit 120 at one-fourth of the output data rate. Equalization multiplexer 130 is a logic circuit that generates main data at 134, and also generates equalization data at 136 from the intermediate data at 122. Parallel-to-serial converter 120 receives data from core circuit 110 to generate intermediate data at 122.

In some embodiments, core circuit 110 operates at less than one-fourth of the output data rate. For example, core circuit 110 may be a memory circuit that sources data on nodes 112 at a smaller fraction of the output data rate. As shown in FIG. 1, nodes 112 may include any number of physical conductors, shown as "M" in FIG. 1. Parallel-to-serial circuit 120 receives data from core circuit 110 at 112, and produces intermediate data at 122 in response to the clock signals TX_CK<3:0>. The operation of the circuits shown in FIG. 1 is now described with reference to the timing diagram in FIG. 2.

Figure 2:
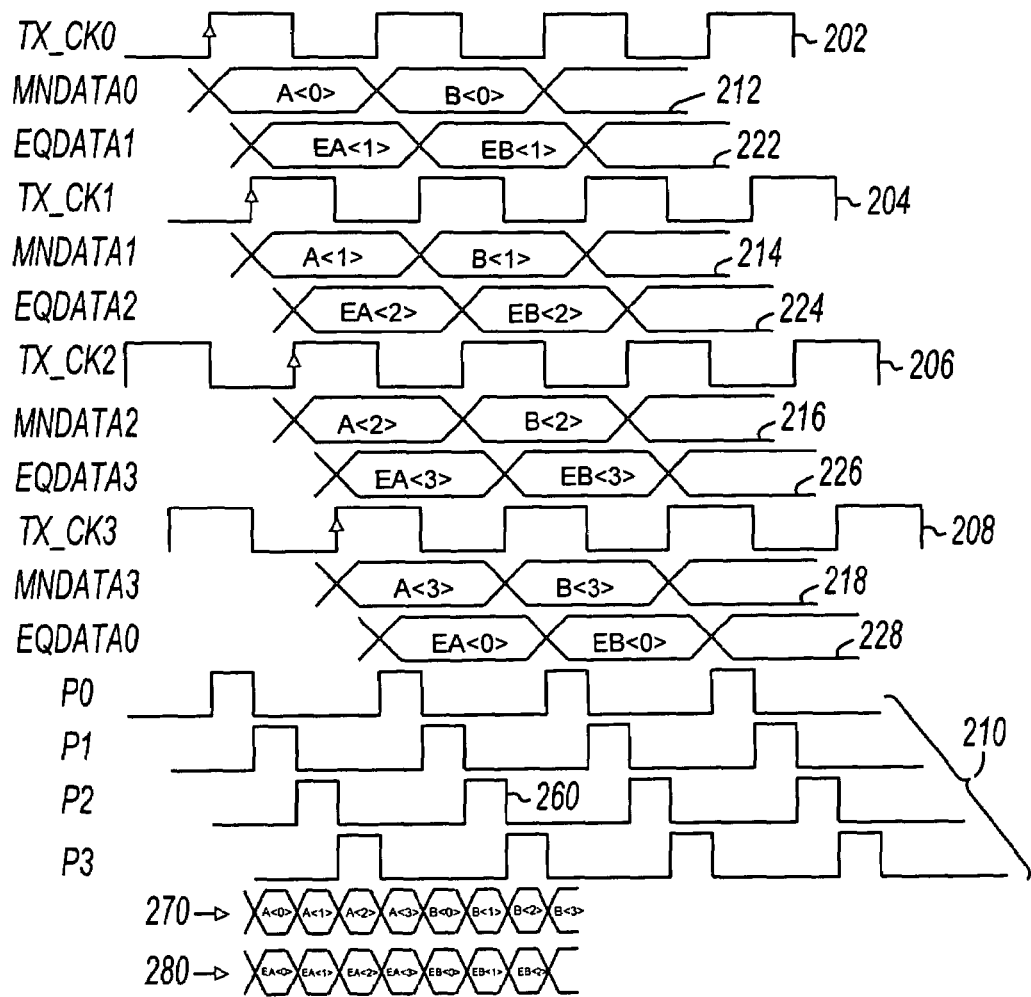
FIG. 2 shows a timing diagram.

Referring now to FIG. 2, the operation of the circuits shown in FIG. 1 is described. Signals 202, 204, 206, and 208 represent the clock signals TX_CK<3:0> used by parallel-to-serial converter 120 to generate intermediate data at 122. Equalization multiplexer 130 receives the intermediate data and generates main data shown at 212, 214, 216, and 218 in FIG. 2. Equalization data 222, 224, 226, and 228 are generated by clocking the main data with the following clock signal. For example, main data 212 is generated when clocked by clock signal 202. Equalization data 222 is generated by clocking main data 212 with following clock signal 204.

Output multiplexer control signals P<3:0> shown at 210 are utilized to steer output multiplexers 140 and 142. Output multiplexers 140 and 142, in response to the output multiplexer control signals 210, select main data and equalization data to be combined on output nodes 190 and 192. For example, pulse 260 is shown selecting main data B<1> at output multiplexer 140 and also selecting equalization data EB<1> at output multiplexer 142. The main data selected by output multiplexer 140 is shown at 270, and the equalization data selected by output multiplexer 142 is shown at 280. In some embodiments, different pulses within output multiplexer control signals 210 may be selected to modify the set up and hold timing between main data and equalization data and the output multiplexer control signals. This is described further with reference to later figures.

Although the circuits of FIG. 1 are described as "quad-rate," this is not a limitation of the present invention. For example, the four-to-one multiplexers may be N-to-1 multi-plexers, and the data rates may be related by a factor of N. As a specific example, and not by way of limitation, in some embodiments, output multiplexers 140 and 142 may be eight-to-one multiplexers, and the output data rate may be eight times the intermediate data rate.

Figure 3:
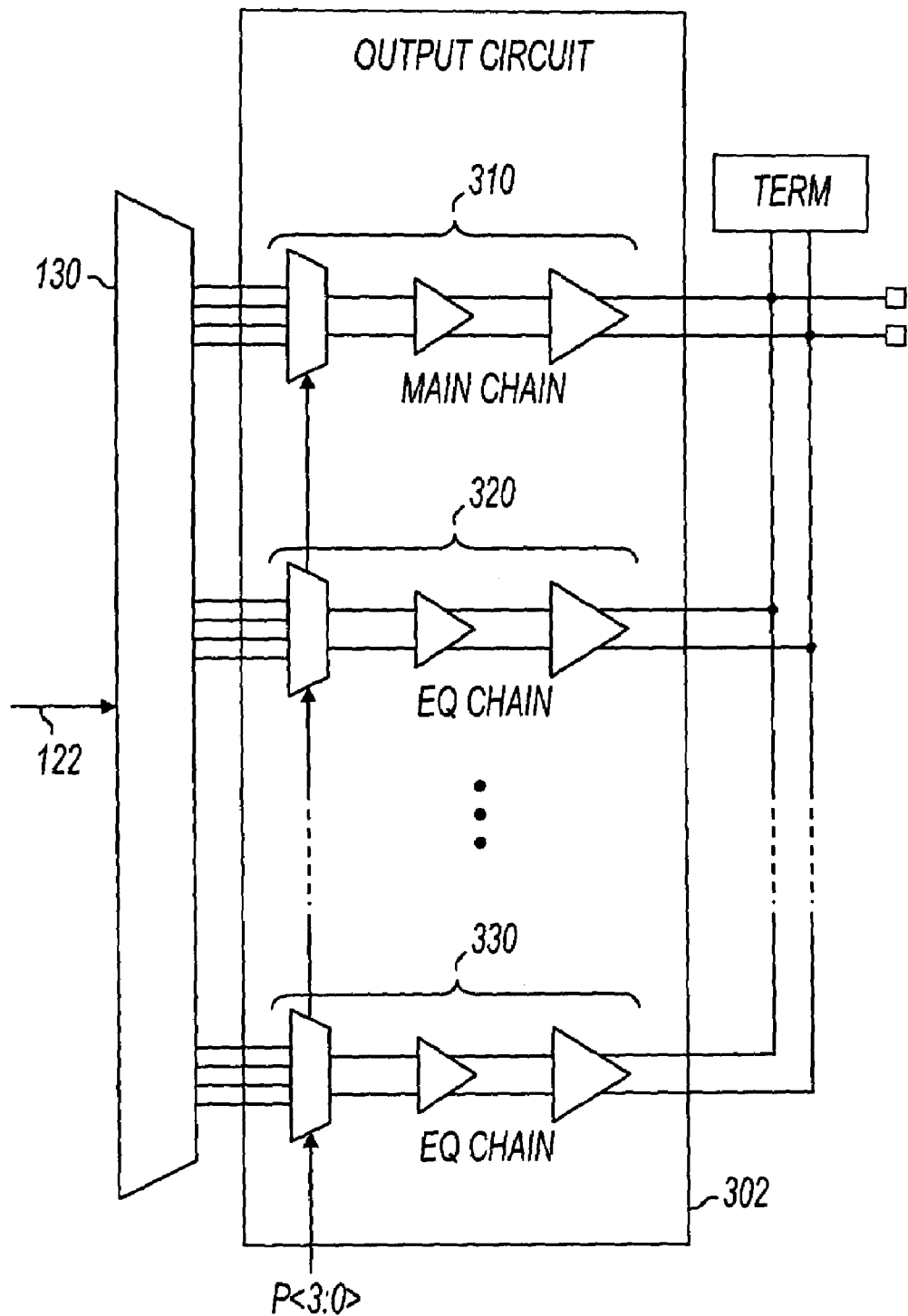
FIG. 3 show a quad rate equalization output circuit.

FIG. 3 shows an equalization multiplexer and an output circuit. As shown in FIG. 3, equalization multiplexer 130 drives output circuit 302 which includes main driver chain 310, and equalization driver chains 320 and 330. As shown in FIG. 3, any number of equalization chains may be present within output circuit 302. In operation, equalization multiplexer 130 drives main data at one-fourth of the output data rate to the output multiplexer in main driver chain 310. Further, equalization multiplexer 130 drives equalization data at one-fourth of the output data rate to equalization driver chains 320 and 330. In various embodiments of the present invention, equalization multiplexer 130 may generate different sets of equalization data to drive the different equalization driver chains. For example, equalization multiplexer 130 may drive one set of equalization data to equalization driver chain 320, and may drive a different equalization data set to equalization driver chain 330. In other embodiments, the same equalization data is driven to all equalization driver chains. In these embodiments, the current mode output drivers may be selectively turned on or turned off to provide mathematical weighting to the equalization data.

Figure 4:
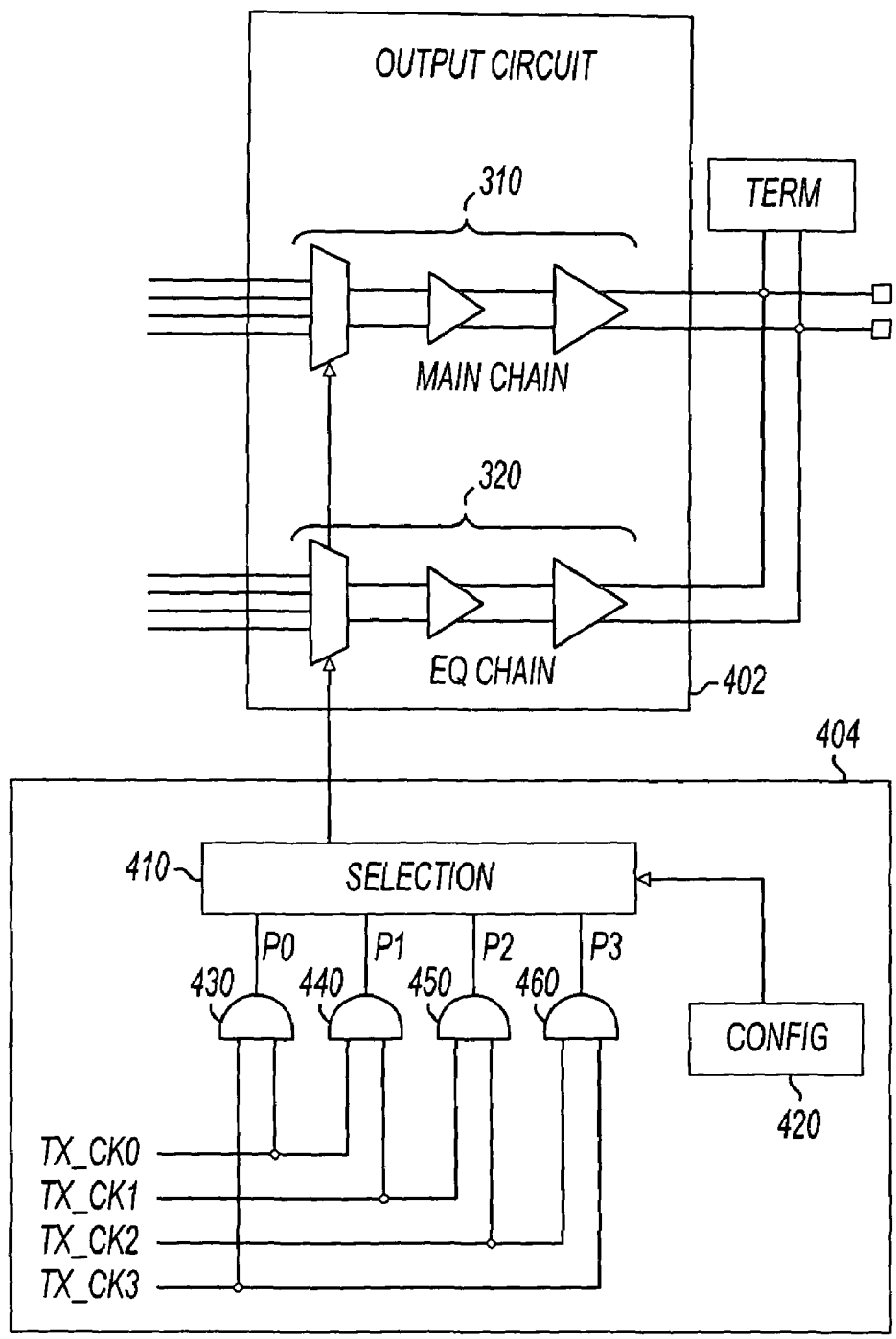
FIG. 4 show a quad rate equalization output circuit with programmable multiplexer control.

FIG. 4 shows an output circuit and a programmable multiplexer control circuit. Output circuit 402 includes main driver chain 310 and equalization driver chain 320, both described above with reference to FIG. 3. Programmable multiplexer control circuit 404 includes configuration register 420, AND gates 430, 440, 450, and 460, and selection circuit 410. AND gates 430, 440, 450, and 460 produce multiplexer control signals 210 (FIG. 2). Selection circuit 410 influences the timing of the output multiplexers in output circuit 402 by selecting which of the multiplexer control signals control the output multiplexers. For example, in response to configuration information programmed in configuration register 420, selection circuit 410 may select P0 to steer main data A<3> and equalization data EA<3> as shown in FIG. 2. Further, selection circuit 410 may select a different one of multiplexer control signals 210 to steer main data A<3> and equalization data EA<3>.

By providing programmable timing for the output multiplexers, integrated circuits manufactured with differing technologies may be supported with a single design. For example, multiple memory manufacturers may be able to use the various embodiments of the present invention and may adapt the timing control signals for the output multiplexers based on the speed of the design.

Figure 5:
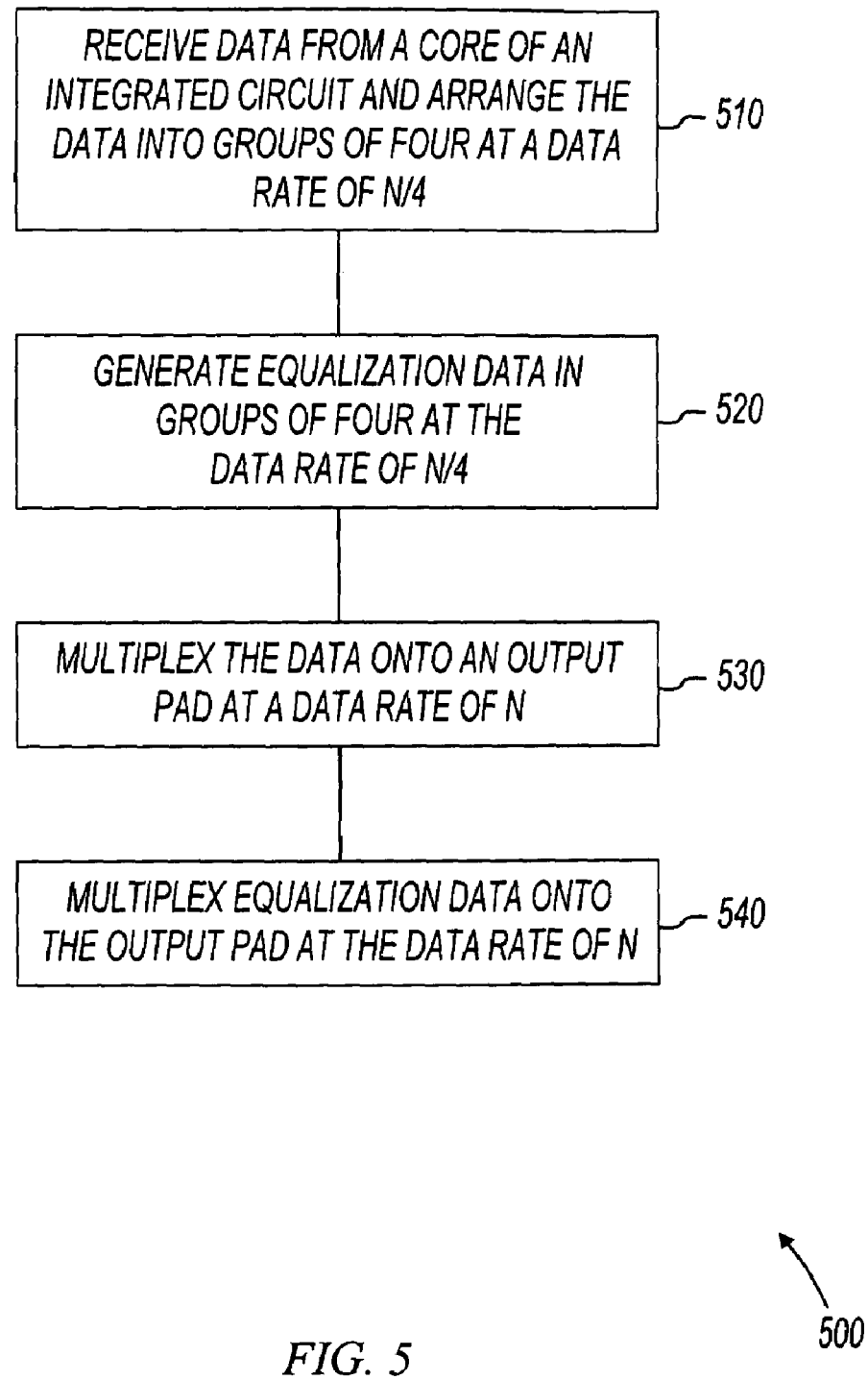
FIG. 5 shows a flowchart in accordance with various embodiments of the present invention.

FIG. 5 shows a flowchart in accordance with various embodiments of the present invention. In some embodiments, method 500 may be used to perform quad rate transmitter equalization. In some embodiments, method 500, or portions thereof, is performed by an output circuit in an integrated circuit, embodiments of which are shown in the various figures. In other embodiments, method 500 is performed by a controller or memory device. Method 500 is not limited by the particular type of apparatus performing the method. The various actions in method 500 may be performed in the order presented, or may be performed in a different order. Further, in some embodiments, some actions listed in FIG. 5 are omitted from method 500.

Method 500 begins at 510 in which data is received from the core of an integrated circuit and arranged into groups of four at a data rate of N/4, where N is an output data rate. The actions of 510 may correspond with equalization multiplexer 130 (FIG. 1) receiving data and generating main data at 134.

At 520, equalization data is generated in groups of four at the data rate of N/4. In some embodiments, the actions of 520 may correspond to equalization multiplexer 130 generating equalization data at 136. Further, the actions of 520 may correspond to equalization multiplexer 130 generating multiple groups of equalization data as shown in FIG. 3.

At 530, the data is multiplexed onto an output pad at a data rate of N. In some embodiments, the actions of 530 correspond to the operation of output multiplexer 140 (FIG. 1). At 540, the equalization data is multiplexed onto the output data pad at the data rate of N. In some embodiments, this corresponds to output multiplexer 142 (FIG. 1) multiplexing data to be combined at output nodes 190 and 192. Further, in some embodiments, the actions of 540 correspond to multiplexing multiple sets of equalization data onto the output nodes as shown in FIG. 3.

Figure 6:
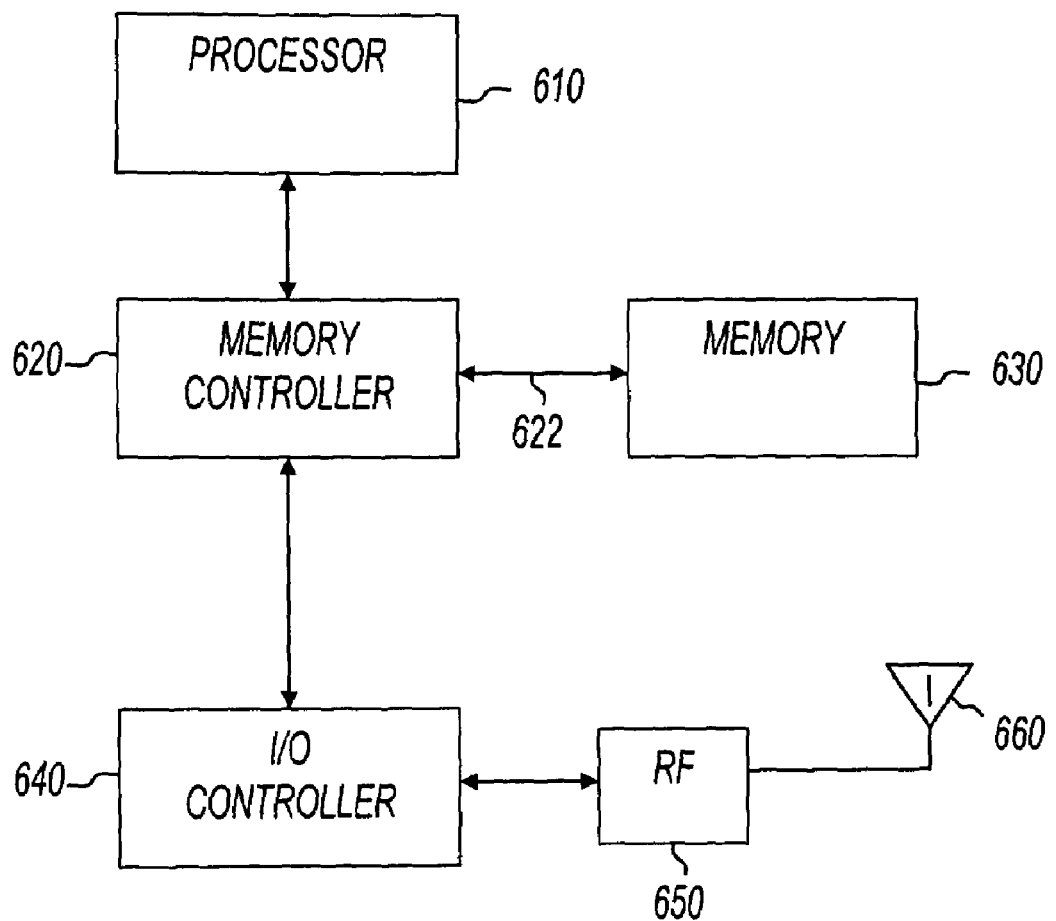
FIGS. 6 and 7 show diagrams of electronic systems in accordance with various embodiments of the present invention.

FIG. 6 shows an electronic system in accordance with various embodiments of the present invention. Electronic system 600 includes processor 610, memory controller 620, memory 630, input/output (I/O) controller 640, radio frequency (RF) circuits 650, and antenna 660. In operation, system 600 sends and receives signals using antenna 660, and these signals are processed by the various elements shown in FIG. 6. Antenna 660 may be a directional antenna or an omni-directional antenna. As used herein, the term omni-directional antenna refers to any antenna having a substantially uniform pattern in at least one plane. For example, in some embodiments, antenna 660 may be an omni-directional antenna such as a dipole antenna, or a quarter wave antenna. Also for example, in some embodiments, antenna 660 may be a directional antenna such as a parabolic dish antenna, a patch antenna, or a Yagi antenna. In some embodiments, antenna 660 may include multiple physical antennas.

Radio frequency circuit 650 communicates with antenna 660 and I/O controller 640. In some embodiments, RF circuit 650 includes a physical interface (PHY) corresponding to a communications protocol. For example, RF circuit 650 may include modulators, demodulators, mixers, frequency synthesizers, low noise amplifiers, power amplifiers, and the like. In some embodiments, RF circuit 650 may include a heterodyne receiver, and in other embodiments, RF circuit 650 may include a direct conversion receiver. In some embodiments, RF circuit 650 may include multiple receivers. For example, in embodiments with multiple antennas 660, each antenna may be coupled to a corresponding receiver. In operation, RF circuit 650 receives communications signals from antenna 660, and provides analog or digital signals to I/O controller 640. Further, I/O controller 640 may provide signals to RF circuit 650, which operates on the signals and then transmits them to antenna 660.

Processor 610 may be any type of processing device. For example, processor 610 may be a microprocessor, a microcontroller, or the like. Further, processor 610 may include any number of processing cores, or may include any number of separate processors.

Memory controller 620 provides a communications path between processor 610 and other devices shown in FIG. 6. In some embodiments, memory controller 620 is part of a hub device that provides other functions as well. As shown in FIG. 6, memory controller 620 is coupled to processor 610, I/O controller 640, and memory 630.

Memory 630 may be any type of memory technology. For example, memory 630 may be random access memory (RAM), dynamic random access memory (DRAM), static random access memory (SRAM), nonvolatile memory such as FLASH memory, or any other type of memory.

Memory 630 may represent a single memory device or a number of memory devices on one or more memory modules. Memory controller 620 provides data through bus 622 to memory 630 and receives data from memory 630 in response to read requests. Commands and/or addresses may be provided to memory 630 through conductors other than bus 622 or through bus 622. Memory controller 630 may receive data to be stored in memory 630 from processor 610 or from another source. Memory controller 620 may provide the data it receives from memory 630 to processor 610 or to another destination. Bus 622 may be a bi-directional bus or unidirectional bus. Bus 622 may include many parallel conductors. The signals may be differential or single ended. In some embodiments, bus 622 operates using a forwarded, multiphase clock scheme.

Memory controller 620 is also coupled to I/O controller 640, and provides a communications path between processor 610 and I/O controller 640. I/O controller 640 includes circuitry for communicating with I/O circuits such as serial ports, parallel ports, universal serial bus (USB) ports, and the like. As shown in FIG. 6, I/O controller 640 provides a communications path to RF circuits 650.

Any of the integrated circuits in system 600 may include the quad rate transmitter equalization embodiments described with reference to the previous figures. For example, memory 630 may include equalization multiplexer 130 and output circuit 132 (FIG. 1).

Figure 7:
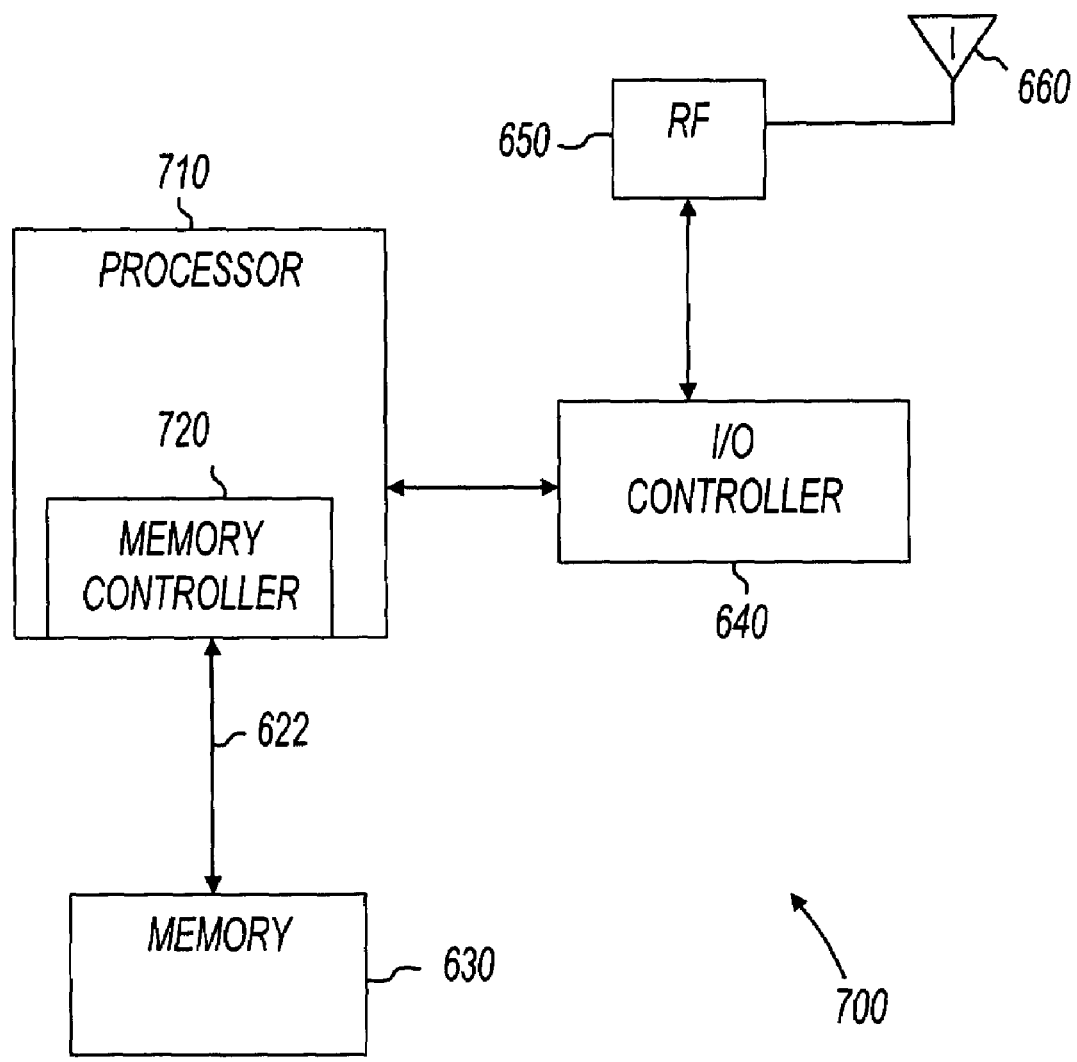

FIG. 7 shows an electronic system in accordance with various embodiments of the present invention. Electronic system 700 includes memory 630, I/O controller 640, RF circuits 650, and antenna 660, all of which are described above with reference to FIG. 6. Electronic system 700 also includes processor 710 and memory controller 720. As shown in FIG. 7, memory controller 720 is included in processor 710. Processor 710 may be any type of processor as described above with reference to processor 610 (FIG. 6). Processor 710 differs from processor 610 in that processor 710 includes memory controller 720, whereas processor 610 does not include a memory controller.

Example systems represented by FIGS. 6 and 7 include desktop computers, laptop computers, cellular phones, personal digital assistants, wireless local area network interfaces, or any other suitable system. Many other systems uses for quad rate transmitter equalization exist. For example, the quad rate transmitter equalization embodiments described herein may be used in a server computer, a network bridge or router, or any other system with or without an antenna.

Output circuits, equalization circuits, and other embodiments of the present invention can be implemented in many ways. In some embodiments, they are implemented in integrated circuits as part of electronic systems. In some embodiments, design descriptions of the various embodiments of the present invention are included in libraries that enable designers to include them in custom or semi-custom designs. For example, any of the disclosed embodiments can be implemented in a synthesizable hardware design language, such as VHDL or Verilog, and distributed to designers for inclusion in standard cell designs, gate arrays, or the like. Likewise, any embodiment of the present invention can also be represented as a hard macro targeted to a specific manufacturing process. For example, portions of integrated circuit 100 (FIG. 1) may be represented as polygons assigned to layers of an integrated circuit.

Although the present invention has been described in conjunction with certain embodiments, it is to be understood that modifications and variations may be resorted to without departing from the spirit and scope of the invention as those skilled in the art readily understand. Such modifications and variations are considered to be within the scope of the invention and the appended claims.

What is claimed is:

1. A circuit comprising:
    a first current mode driver to drive output data on an output node at an output data rate;
    a first N-to-one multiplexer coupled to provide the output data to the first current mode driver;
    a second current mode driver to drive equalization data on the output node at the output data rate;
    a second N-to-one multiplexer coupled to provide the equalization data to the second current mode driver;
    a logic circuit to receive intermediate data and drive the first and second N-to-one multiplexers with the output data and equalization data, respectively, at 1/N of the output data rate, wherein the logic circuit is to generate the output data from the intermediate data with a first clock signal of N clock signals, and the logic circuit is to generate the equalization data with a second clock signal of the N clock signals; and
    a parallel-to-serial converter circuit to receive data at less than 1/N of the output data rate, and coupled to provide the intermediate data to the logic circuit at 1/N of the output data rate using the N clock signals, wherein N is greater than 2.

2. The circuit of claim 1 further comprising a programmable multiplexer control circuit to steer the first and second N-to-one multiplexers.

3. The circuit of claim 2 wherein the programmable multiplexer control circuit is to steer responsive to a configuration register.

4. The circuit of claim 3, wherein the programmable multiplexer control circuit includes N logics each to receive a pair of the N clock signals and to provide a multiplexer control signal to a selection circuit, wherein the selection circuit is to select which of the multiplexer control signals to provide to the first and second N-to-one multiplexers responsive to configuration information in the configuration register.

5. The circuit of claim 1 further comprising a third current mode driver to drive additional equalization data on the output node at the output data rate.

6. The circuit of claim 5 further comprising a third N-to-one multiplexer coupled to provide the additional equalization data to the third current mode driver.

7. A memory device comprising:
    an output node;
    an output circuit to drive data on the output node at an output data rate;
    a memory core circuit to source memory data at less than 1/N of the output data rate;

a parallel-to-serial converter coupled to receive the memory data and source intermediate data at 1/N of the output data rate; and a logic circuit coupled to receive the intermediate data and coupled to provide the output circuit with output data at 1/N of the output data rate, and further coupled to provide the output circuit with equalization data at 1/N of the output data rate, wherein the logic circuit is to generate the output data from the intermediate data with a first clock signal of N clock signals, and the logic circuit is to generate the equalization data with a second clock signal of the N clock signals, wherein N is greater than 2.

8. The memory device of claim 7 wherein the output circuit includes a first N-to-one multiplexer coupled to receive the output data from the logic circuit and a first current mode driver to drive the output data on the output node at the output data rate.

9. The memory device of claim 8 wherein the output circuit further includes a second N-to-one multiplexer coupled to receive the equalization data from the logic circuit and a second current mode driver to drive the equalization data on the output node at the output data rate.

10. The memory device of claim 9 further comprising a programmable multiplexer control circuit to steer the first and second N-to-one multiplexers.

11. The memory device of claim 10 wherein the programmable multiplexer control circuit is to steer responsive to a configuration register.

12. The memory device of claim 7 further comprising at least one additional N-to-one multiplexer and at least one additional current mode driver to drive additional equalization data on the output node at the output data rate.

13. An electronic system comprising:
an antenna;
a radio frequency circuit coupled to the antenna;
a controller coupled to the radio frequency circuit; and
a memory device coupled to the controller, the memory device including an output node, an output circuit to drive data on the output node at an output data rate, a memory core circuit to source memory data at less than 1/N of the output data rate, a parallel-to-serial converter coupled to receive the memory data and source intermediate data at 1/N of the output data rate, and a logic circuit coupled to receive the intermediate data and coupled to provide the output circuit with output data at 1/N of the output data rate, and further coupled to provide the output circuit with equalization data at 1/N of the output data rate, wherein the logic circuit is to generate the output data from the intermediate data with a first clock signal of N clock signals, and the logic circuit is to generate the equalization data with a second clock signal of the N clock signals, wherein N is greater than 2.

14. The electronic system of claim 13 wherein the output circuit includes a first N-to-one multiplexer coupled to receive the output data from the logic circuit and a first current mode driver to drive the output data on the output node at the output data rate.

15. The electronic system of claim 14 wherein the output circuit further includes a second N-to-one multiplexer coupled to receive the equalization data from the logic circuit and a second current mode driver to drive the equalization data on the output node at the output data rate.

16. The electronic system of claim 15 wherein the memory device further comprises a programmable multiplexer control circuit to steer the first and second N-to-one multiplexers.

* * * * *